3,706,728
N(6)-BRANCHED CHAIN LOWER-ALKYL-
ADENOSINE DERIVATIVES
Erich Fauland, Mannheim-Waldhof, Wolfgang Kampe, Heddesheim, Max Thiel and Wolfgang Juhran, Mannheim, Karl Dietmann, Mannheim-Waldhof, and Harald Stork, Lampertheim, Germany, assignors to Boehringer Mannheim GmbH, Postfach, Germany
No Drawing. Filed Mar. 4, 1970, Ser. No. 16,617
Claims priority, application Germany, Mar. 19, 1969,
P 19 13 818.2, P 19 13 816.0
Int. Cl. C07d 51/54
U.S. Cl. 260—211.5 R    9 Claims

ABSTRACT OF THE DISCLOSURE

Novel N(6)-alkyl-adenosine derivatives of the formula

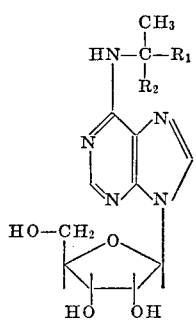

wherein $R_1$ is straight-chain or branched-chain alkyl of from 1 to 6 carbon atoms; and $R_2$ is methyl or, when $R_1$ contains more than one carbon atom, $R_2$ can also be hydrogen; are useful as cardio- and circulatory-active agents and in influencing fat metabolism.

---

The present invention is concerned with novel N(6)-alkyl-adenosine derivatives and therapeutic compositions containing them.

The new N(6)-alkyl-adenosine compounds of this invention are compounds of the general formula

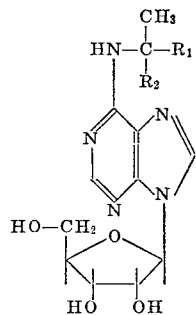

(I)

wherein $R_1$ is straight-chain or branched-chain alkyl of from 1 to 6 carbon atoms; and $R_2$ is methyl or, when $R_1$ contains more than one carbon atom, $R_2$ can also be hydrogen. Thus, $R_1$ and $R_2$ together must contain at least two carbon atoms, in a given compound, in the novel compounds of this invention.

We have found that these new adenosine compounds are especially interesting cardiac- and circulatory-active pharmaceuticals because they also influence the fat metabolism.

The effectiveness and manner of action of these novel compounds with regard to the concentration of free fatty acids and triglycerides in serum is a completely new and unexpected effect which is associated with a more or less strong cardiac and circulatory action, especially a peripheral blood vessel dilating action, depending upon the nature of the substituents $R_1$ and $R_2$. Thus, for example, we have found, surprisingly, that N(6)-tert.-butyl-adenosine causes a marked reduction in concentration of the free fatty acids and triglycerides in the serum but, in the dosage range in which other adenosine derivatives exert a strong cardiac-circulatory action, exhibits no such action.

This new and surprising property can be demonstrated on alert rats and on alert dogs. In the case of rats, a dose of 0.025 mg./kg. intraperitoneally brings about, one hour after administration, a lowering of the free fatty acids in the serum by about 30%; up to a dosage of 0.125 mg./kg., the compound has no effect on the blood pressure of awake rats. In the case of awake dogs, 0.25 mg./kg. intravenously brings about a lowering of the free fatty acids of at least 15%. However, up to a dosage of 1 mg./kg. intravenously, no changes of frequency or of blood pressure are observed in awake dogs.

Thus, the new derivatives of adenosine according to the present invention are characterized in that they exert an influence on the fat metabolism, and furthermore, in that, in some cases, they exhibit interesting cardiac and circulatory actions. In borderline cases, the vasodilatory side-effect can even be completely absent.

For the preparation of the new compounds (I) according to the present invention, purine ribosides of the general formula

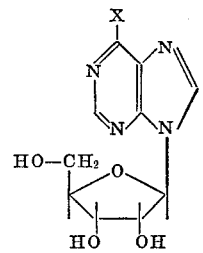

(II)

wherein X is a halogen atom or a reactive mercapto group, are reacted with amines of the general formula

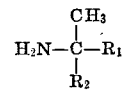

(III)

wherein $R_1$ and $R_2$ have the same meanings as above. If desired, the hydroxyl groups in the ribose residue can be temporarily blocked by protective groups which are easily split off.

As starting compounds of general Formula II, it is preferred to use the chloro or bromo derivatives; compounds of this type are described, for example, in Coll. Czech. Chem. Comm., 30, 1880/1965 and in Biochemical Preparations, 10, 148/1963.

For carrying out the process according to the present invention, the reaction components are expediently heated in an appropriate inert solvent, preferably in a higher boiling alcohol, for example, isopropanol, n-propanol or butanol, or in a higher boiling ether, for example, tetrahydrofuran or dioxane, optionally in the presence of an equimolar amount of a tertiary amine, preferably triethylamine. Alternatively, the reaction mixture can be left to stand for several days at ambient temperature. However, it is also possible to omit the solvent and, in place thereof to use one of the reaction components, preferably the amine component (III), in excess.

If it is desired to block the hydroxyl groups in the compounds (II) temporarily, then there can be used the protective groups normally employed in sugar chemistry.

For this purpose, there can be used, for example, acyl groups, preferably acetyl or benzoyl radicals, or there can be used ketals, such as the 2',3'-isopropylidene compounds, which, after the condensation reaction has been carried out, can easily be converted by the action of acids into the free 2',3'-dihydroxy compounds. However, when acyl radicals are used as protective groups, they are split off by alkaline hydrolysis.

The following examples are given for the purpose of illustrating the present invention:

EXAMPLE 1

Preparation of N(6)-sec.-butyl-adenosine

Variation (a).—20.5 g. triacetyl-6-chloro-9-(β-D-ribofuranosyl)-purine and 11.6 g. sec. butylamine were dissolved in 100 ml. isopropanol and left to stand for 24 hours at ambient temperature. The reaction mixture was then evaporated in a vacuum and the residue dissolved in benzene. This solution was washed several times with water, dried and evaporated. The remaining syrup was taken up in 40 ml. methanol and the solution obtained, after the addition of 2 ml. 1 N-sodium methylate solution, boiled under reflux for 10 minutes. The precipitate obtained after leaving to stand for several hours at ambient temperature was filtered off with suction and recrystallized from methanol. There were obtained 3.8 g. (23.6% of theory) N(6)-sec.-butyl-adenosine, which had a melting point of 118–120° C.

Variation (b).—25.0 g. 6-chloro-9-(β-D-ribofuranosyl)-purine and 150 ml. sec.-butylamine were heated in a glass autoclave for 1 hour at 110° C. After cooling, the precipitated sec.-butylamine hydrochloride was filtered off with suction and the filtrate evaporated. The residue was dissolved in methanol and again evaporated in a vacuum. The remaining syrup was taken up in ethyl acetate and the solution obtained left to stand for 12 hours at ambient temperature. Further sec.-butylamine hydrochloride thereby precipitated out. This was filtered off with suction and the filtrate evaporated. The amorphous residue was then mixed with ether. Upon standing overnight, the desired product crystallized out. After filtering off with suction, there were obtained 20.6 g. (73% of theory) N(6)-sec.-butyl-adenosine, which had a melting point of 118–120° C.

EXAMPLE 2

Preparation of N(6)-(1,3-dimethyl-butyl)-adenosine 6.15 g. triacetyl - 6 - chloro - 9-β-D-ribofuranosyl)-purine, 2.0 g. 2-amino-4-methyl-pentane and 3.0 g. triethylamine were dissolved in 50 ml. anhydrous tetrahydrofuran and left to stand for 3 days at ambient temperature. The reaction mixture was then evaporated in a vacuum, the residue taken up with benzene and the solution repeatedly washed with water, subsequently dried and again evaporated. The residue was dissolved in 50 ml. methanol saturated with ammonia and left to stand overnight at ambient temperature. After driving off the solvent, there was obtained a dark brown syrup which did not crystallize even after standing for quite a long time. For further purification, it was dissolved in chloroform and the chloroform phase extracted four times with 50 ml. amounts of 0.2 N-hydrochloric acid. The hydrochloric acid extracts were combined, adjusted to pH 8–9 with ammonia and shaken out 3 or 4 times with ethyl acetate. The ethyl acetate solution was dried, treated with activated charcoal, filtered and evaporated. There were obtained 2,3 g. (44% of theory) N(6)-(1,3-dimethyl-butyl)-adenosine in the form of a non-crystalline, solid foam with a melting point of 89–91° C.

EXAMPLE 3

The compounds set out in the following table were prepared in a manner analogous to that described in Examples 1 and 2:

TABLE

| Compound | Melting point, ° C. | Yield percent |
|---|---|---|
| N(6)-(1-methyl-butyl)-adenosine | 141–143 | 28.0 |
| N(6)-(1,2-dimethylbutyl)-adenosine | 78–82 | 37.8 |
| N(6)-(1,1,3,3-tetramethyl-butyl)-adenosine | 115–117 | 53.0 |
| N(6)-(1,4-dimethylpentyl)-adenosine | 98–100 | 31.5 |
| N(6)-(1,3-dimethylpentyl)-adensoine | 98–100 | 47.0 |
| N(6)-(1,5-dimethylhexyl)-adenosine | 89–91 | 21.0 |

EXAMPLE 4

N(6)-tert.-butyl-adenosine 25.0 g. 6-chloro-9-(β-D-ribofuranosyl)-purine and 150 ml. tert.-butylamine were heated for one hour at 110° C. in a glass autoclave. After cooling, precipitated tert.-butylamine hydrochloride was filtered off with suction and the filtrate evaporated. The residue was dissolved in methanol and again evaporated in a vacuum. The remaining syrup was taken up in ethyl acetate and the solution left to stand for 12 hours at ambient temperature. Further tert.-butylamine hydrochloride thereby precipitated out. This was filtered off with suction and the filtrate evaporated.

The amorphous residue was mixed with ether. Upon standing overnight, N(6)-tert.-butyl-adenosine crystallized out. After filtering off with suction, there were obtained 20.6 g. (73% of theory) of crystalline product which had a melting point of 115–117° C.

In order to illustrate the effectiveness of the N(6)-substituted adenosine derivatives on coronary blood circulation and the novel effect on the lowering of the level of free fatty acids in blood serum a test was carried out using the compounds contemplated herein and, for purposes of comparison, N(6)-methyl-adenosine, which has been described in the literature (Bredereck et al., Chem. Ber. 81, 307 [1948]).

Adenosine on intravenous administration in mammals and humans produces a vaso-dilation. In particular this effect is noticeable in the coronary vascular system wherein a marked increase in blood circulation results from the vaso-dilation produced by administration of adenosine (Berne et al., J. Clin. Invest. 36, 1101 [1957]). However, due to the rapid deamination of adenosine, this effect is only transient. The N(6)-substituted derivatives of adenosine in accordance with the invention have been found to exert a marked coronary vaso-dilating effect of high specificity but in contrast to adenosine, the effect is a prolonged one.

Increased blood circulation in the coronary system, provided that there are no significant changes in the myocardial oxygen consumption, results in a reciprocal decrease of the coronary arteriovenous oxygen difference. This decrease in extraction of oxygen from the blood leads to an additional supply of oxygen and namely, that an improvement in the oxygen supply to the myocardium which is the ultimate aim sought to be achieved with all coronary dilating agents.

The following compounds were tested:

Compound 1: N(6)-sec.-butyl-adenosine
Compound 2: N(6)-tert.-butyl-adenosine
Compound 3: N(6)-(1,3-dimethylbutyl)-adenosine
Compound 4: N(6)-(1-methylbutyl)-adenosine
Compound 5: N(6)-(1,2-dimethylbutyl)-adenosine
Compound 6: N(6)-(1,4-dimethylpentyl)-adenosine
Compound 7: N(6)-(1,3-dimethylpentyl)-adenosine
Compound 8: N(6)-1,5-dimethylhexyl)-adenosine
Compound A: N(6)-methyl-adenosine For the purpose of obtaining an exact basis for evaluating the results of the procedures involved, the decrease in coronary arteriovenous oxygen difference (at the time of the maximum effect) has been reported in volume percent in the table as compared to the starting value. The greater the value reported the more significant was the coronary oxygen supply increase. The test procedures were carried out using 15 alert unanesthetized dogs, each weighing between 12 and 16 kg. The procedure of Rayford, Huvos and Gregg. Proc. Soc. Exp. Biol. Med. 113, 876 [1963] were followed, catheters having been implanted surgically into the Sinus coronarius the aorta and the vena cava of the animals. It was thus made possible to photometrically determine the coronary arteriovenous saturation difference (Brinkman, Arch. Chir. Neerl. 1, 177 [1949]) and from the actual hemoglobin values obtained to convert the values into the corresponding volume percents. The compounds were administered intravenously in the amounts indicated in 1 ml. of a 5 percent Lutrol-9-solution (liquid polyethylene oxide, molecular weight about 400, BASF-Ludwigshafen) in 5.5 percent aqueous glucose.

The effectiveness on the lowering of free fatty acids in the blood serum was determined following the procedure of Duncombe et al. (Clin. Chim. Acta 9, 122 [1964]). The procedure was carried out using for each compound five Sprague-Dawley-rats, each weighing about 200 g. The animals were kept without food during 18 hours before application. The compounds were administered per os (p.o.) or parenterally (intraperitoneally (i.p.) or intravenously (i.v.)), as indicated below, in an isotonic saline solution. One hour after application of the compounds (or of the isotonic saline solution alone for establishing the control values) the animals were killed and exsanguinated.

The results of the tests are set forth in the following Table I:

TABLE I

| Compound | Coronary oxygen supply increase | | Fatty acid decrease | | | |
|---|---|---|---|---|---|---|
| | Dosage, mg./kg. i.v. | Decrease of the coronary O2 depletion [1] | Dosage, mg./kg. | Application | Animals killed after hours | Decrease of free fatty acids in percent |
| 1 | 0.4 | 3.8 | 0.5 | i.p. | 1 | 41 |
| 2 | 0.4 | 0.9 | 0.25 | i.p. | 2 | 64.3 |
| | | | 0.25 | p.o. | 2 | 62.1 |
| | | | 0.25 | i.v. | 1 | 62 |
| 3 | 0.4 | 4.3 | 0.5 | i.p. | 1 | 62 |
| 4 | 0.4 | 7.5 | 0.5 | i.p. | 1 | 55 |
| 5 | 0.2 | 6.0 | 0.5 | i.p. | 1 | 62 |
| 6 | 0.2 | 7.0 | 0.5 | i.p. | 1 | 52 |
| 7 | 0.4 | 6.0 | 0.5 | i.p. | 1 | 54 |
| 8 | 0.4 | 1.7 | 0.5 | i.p. | 1 | 56 |
| A | 2.0 | <0.5 | 0.5 | i.p. | 1 | 0 |

[1] At maximum effect, in volume percent as compared to the controls.

From Table I it can be seen that the compounds in accordance with the invention constitute highly valuable therapeutic agents having coronary dilating properties as well as a marked and surprising efficiency on lowering the blood level of free fatty acids and triglycerides.

In accordance with the method of treatment of the present invention, the compounds can be given via the oral route. However, the compounds can also be administered as parenterals in the form of their solutions or suspensions. The compounds can be administered either alone and/or preferably in combination with a pharmaceutically acceptable carrier, and such administration can be carried out in both single and multiple dosages. More particularly, the compounds of this invention can be administered in a wide variety of different dosage forms wherein they are combined with various pharmaceutically acceptable inert carriers in the form of tablets, capsules, dragees, powders, aqueous suspensions, solutions, and the like. Such carriers include solid diluents or fillers, liquid aqueous media and various non-toxic organic solvents, etc. In general, the therapeutically effective compounds are present in such dosage forms at concentration levels ranging from about 0.01 to about 90% by weight of the total composition i.e. in amounts which are sufficient to provide the desired unit dosage.

In dosage unit form, the compounds as set out herein are used in amounts of from 0.1–50 mg., preferably the compositions are compounded so that for parenteral administration, 0.5–5 mg. of active compound/dosage unit is present and for oral administration 2–10 mg. of compound/dosage unit.

In the case of N(6)-tert.-butyl-adenosine (Compound 2, above) the efficiency in lowering the blood level of free fatty acids is pronounced, whereas the coronary dilating properties are relatively weak. Therefore, this compound is a new type of drug of most desirable pharmacological properties. As can be seen from the Table I the ratio of increase of coronary oxygen supply and decrease of free fatty acids in blood serum can be varied according to desired therapeutic effects.

What is claimed is:
1. N(6)-alkyl-adenosine derivative of the formula

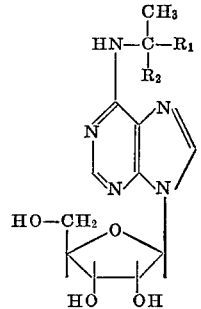

wherein $R_1$ is straight-chain or branched-chain alkyl of from 1 to 6 carbon atoms; and $R_2$ is methyl or hydrogen; with the proviso that $R_1$ and $R_2$ taken together must contain at least two carbon atoms.

2. Compound as claimed in claim 1 wherein the N(6)-alkyl-adenosine is N(6)-sec.-butyl-adenosine.

3. Compound as claimed in claim 1 wherein the N(6)-alkyl-adenosine is N(6)-tert.-butyl-adenosine.

4. Compound as claimed in claim 1 wherein the N(6)-alkyl-adenosine is N(6)-(1,3-dimethylbutyl)-adenosine.

5. Compound as claimed in claim 1 wherein the N(6)-alkyl-adenosine is N(6)-(1-methylbutyl)-adenosine.

6. Compound as claimed in claim 1 wherein the N(6)-alkyl-adenosine is N(6)-(1,2-dimethylbutyl)-adenosine.

7. Compound as claimed in claim 1 wherein the N(6)-alkyl-adenosine is N(6)-(1,4-dimethylpentyl)-adenosine.

8. Compound as claimed in claim 1 wherein the N(6)-alkyl-adenosine is N(6)-(1,3-dimethylpentyl)-adenosine.

9. Compound as claimed in claim 1 wherein the N(6)-alkyl-adenosine is N(6)-(1,5-dimethylhexyl)-adenosine.

References Cited
UNITED STATES PATENTS 3,269,917   8/1966   Imada et al. ____ 260—211.5 R
3,471,472   10/1969  Thiel et al. ____ 260—211.5 R
3,475,408   10/1969  Kuhn et al. ____ 260—211.5 R
3,551,409   12/1970  Kampe et al. ____ 260—211.5 R LEWIS GOTTS, Primary Examiner J. R. BROWN, Assistant Examiner U.S. Cl. X.R.
424—180